(No Model.)
T. M. BROWN.
ELECTRIC RAILWAY TROLLEY.
No. 520,156. Patented May 22, 1894.
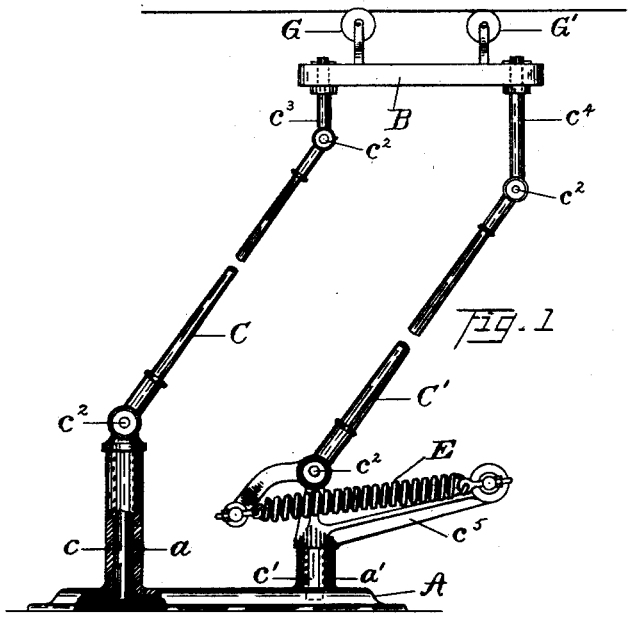
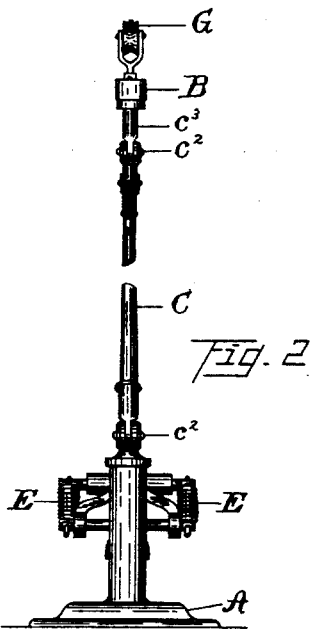
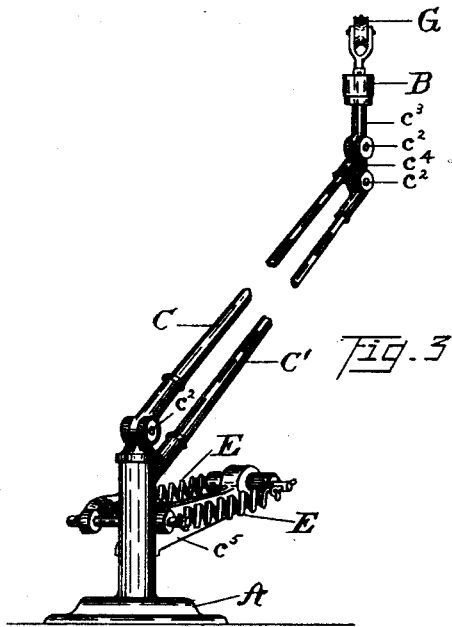
WITNESSES.
L. Griswold
Nellie M. Wood
INVENTOR.
Thomas Morris Brown
By Wing & Thurston
his attys

United States Patent Office.

THOMAS MORRIS BROWN, OF CLEVELAND, OHIO.

ELECTRIC-RAILWAY TROLLEY.

SPECIFICATION forming part of Letters Patent No. 520,156, dated May 22, 1894.

Application filed September 28, 1893. Serial No. 486,744. (No model.)

*To all whom it may concern:*

Be it known that I, THOMAS MORRIS BROWN, a citizen of the United States, residing at Cleveland, in the county of Cuyahoga and State of Ohio, have invented certain new and useful Improvements in Trolleys; and I do hereby declare the following to be a full, clear, and exact description of the invention, such as will enable others skilled in the art to which it appertains to make and use the same.

My invention relates to trolley devices for making electrical connection between an elevated line wire and the motor on a street car, or other vehicle.

The object is to provide a trolley construction with which the said connection may be made, whatever be the height of the wire, and whether said wire be above or to one side or the other of the path of travel of the vehicle.

The invention consists in the construction and combination of parts hereinafter described and pointed out definitely in the claims.

In the drawings Figure 1 is a side view of my improved device. Fig. 2 is an end view thereof; and Fig. 3 is an end view showing the position of the parts when the trolley is riding on a line wire to one side of the path of travel of the vehicle.

Referring to the parts by letter, A represents a base plate which supports the other parts, and by means of which they are secured to the car or other vehicle.

B represents a plate which carries the contact device,—which should preferably be a sheave or sheaves G G'.

C C' represent two parallel trolley poles, each of which is connected at its lower end by a universal joint to the base plate A; and at its upper end by a universal joint to the plate B. The described connection between the lower ends of the trolley poles, as shown, is produced as follows: Two vertical posts $c\,c'$ are mounted in the vertical hollow standards $a\,a'$ on the plate A, whereby said posts are adapted to turn freely on vertical axes. A horizontal pivot $c^2$ connects the lower end of each trolley pole with one of said posts. Two vertical posts $c^3\,c^4$ are pivoted to the under side of the plate B on vertical axes; and the upper end of each trolley pole is pivoted by means of a horizontal pivot $c^2$ to one of said posts $c^3\,c^4$. In order that the trolley poles may, when desired, be drawn down nearer to the car than would be possible otherwise, I make the rear post $c'$ shorter than the front post $c$; and I make a like difference in lengths in the upper posts $c^3\,c^4$,—making the rear post the longer.

Any form of contact device may be mounted on the top of plate B, but I prefer to employ two sheaves G G', because a better electrical connection is thereby made with the line wire, and there is less likelihood that said trolley will jump from the wire when the wire is at one side of the path of travel of the car.

Springs E E are connected with one of the trolley poles in any suitable manner so as to exert its force on said pole, to hold the sheaves up against the line wire. I have shown two contractile coil springs connected at one end with a prolongation of the trolley pole C', and at the other end with an arm $c^5$ on the post $c'$. This particular construction is, however, no part of my invention.

It is apparent that the plate B will remain parallel to the plate A whatever be the angle of inclination of the trolley poles with reference to the base plate; and that a like condition will be maintained however much the trolley may be drawn to one side or the other of the path of travel of the car,—as shown in Fig. 3.

Having described my invention, I claim—

1. In a trolley device, in combination, a base plate A, a plate B, a contact device carried by said plate B, two parallel trolley poles, and universal joint connections between said poles and the two plates, substantially as and for the purpose specified.

2. In a trolley device, in combination, a base plate A, two vertical posts $c\,c'$ pivoted thereto, a plate B, a contact device carried by said plate, two vertical posts $c^3\,c^4$ pivoted to the under side of plate B, two parallel trolley poles C C', and horizontal pivots $c^2$ which connect the lower ends of said pole with the posts $c$ $c'$ respectively, and the upper ends of said poles with the posts $c^3$ $c^4$ respectively, substantially as and for the purpose specified.

3. In a trolley device, a base plate A, two vertical posts $c$ $c'$ of unequal length pivoted thereto, a plate B, a contact device carried thereby, two vertical posts $c^3$ $c^4$ of unequal length pivoted thereto, two parallel trolley poles having their upper ends connected by horizontal pivots to the two posts $c^3$ $c^4$ respectively, and their lower ends similarly connected with the posts $c$ $c'$ respectively, substantially as and for the purpose specified.

In testimony whereof I affix my signature in presence of two witnesses.

THOMAS MORRIS BROWN.

Witnesses:
    E. L. THURSTON,
    F. GRISWOLD.